J. W. DAVIS.
UNIVERSAL KNUCKLE.
APPLICATION FILED APR. 11, 1917.
1,260,342.
Patented Mar. 26, 1918.
2 SHEETS—SHEET 1.
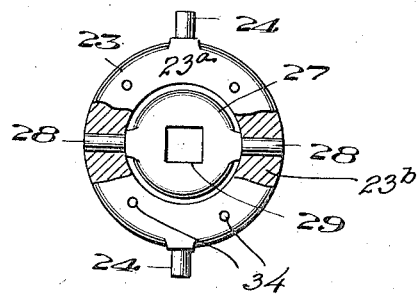
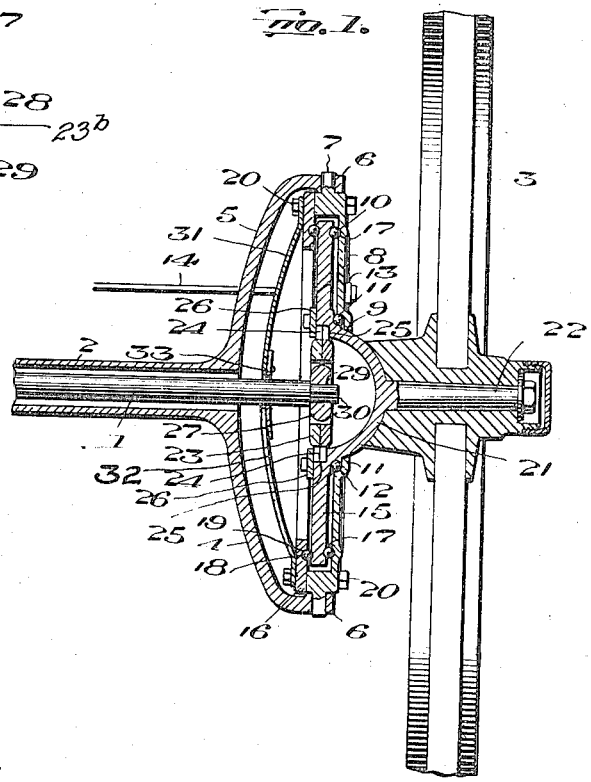
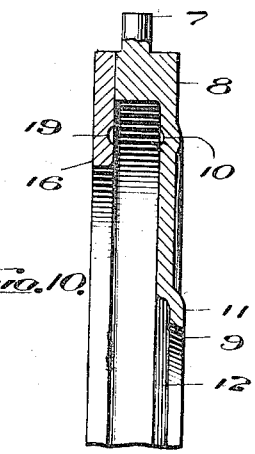
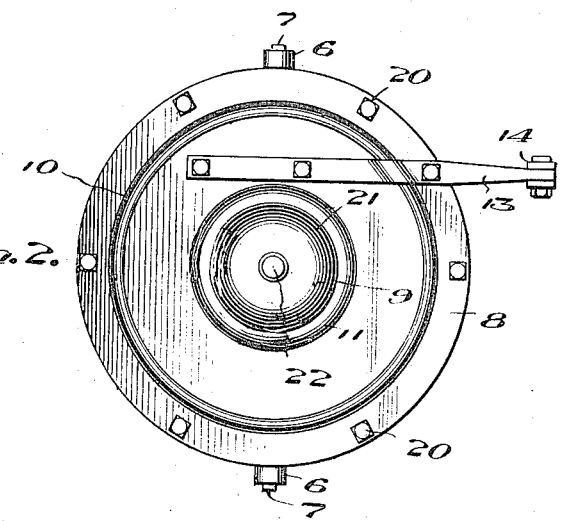
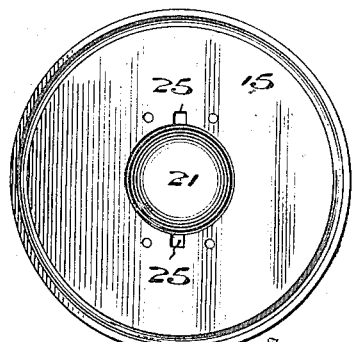

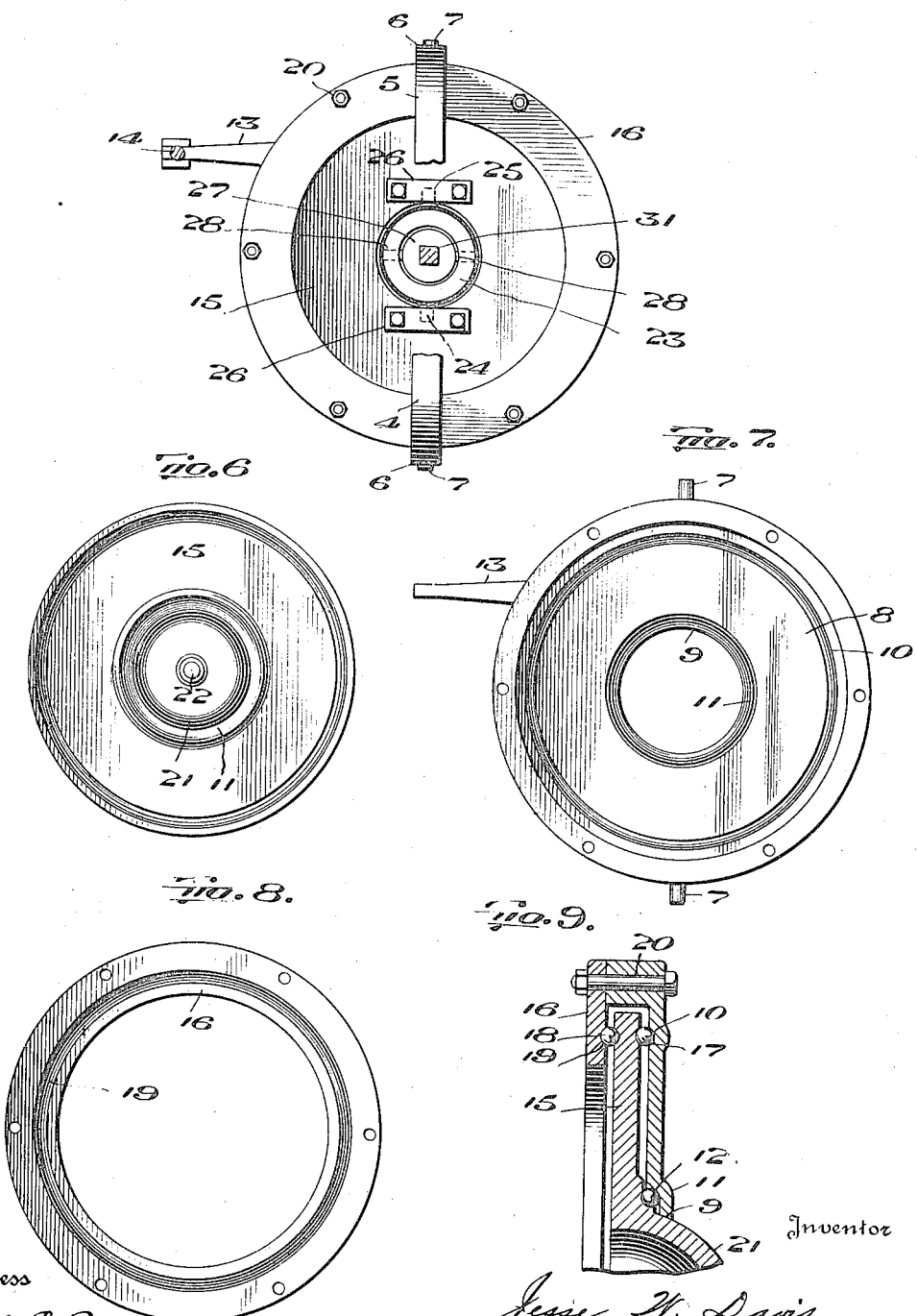

UNITED STATES PATENT OFFICE.

JESSE WISMAN DAVIS, OF MIDDLETON, TENNESSEE, ASSIGNOR OF ONE-HALF TO JOHN W. McINTYRE, OF POCAHONTAS, TENNESSEE.

UNIVERSAL KNUCKLE.

1,260,342.  Specification of Letters Patent.  Patented Mar. 26, 1918.

Application filed April 11, 1917. Serial No. 161,288.

*To all whom it may concern:*

Be it known that I, JESSE W. DAVIS, a citizen of the United States, residing at Middleton, in the county of Hardeman and State of Tennessee, have invented certain new and useful Improvements in Universal Knuckles; and I do hereby declare the following to be a full, clear, and exact description of the invention, such as will enable others skilled in the art to which it appertains to make and use the same.

This invention is a driving mechanism for vehicle wheels wherein a vehicle may be driven from the steering wheels, in addition to being driven from the ordinary driving wheels thereof.

A purpose of the invention is to provide means to mount a wheel of the vehicle whereby the wheel axle may have universal movement relative to the driving shaft.

The invention aims to simplify the construction and to provide an efficient structure which will be durable in operation.

The invention comprises a drive shaft associated with which may be a stationary sleeve carrying oppositely positioned supporting arms. Pivotally mounted between the arms is a guide plate to which is secured a case-cap to retain a rotatable disk. The guide plate may be connected with the steering mechanism of the vehicle. Suitable anti-friction members may be employed between the disk, the guide plate and the case-cap. The rotatable disk is provided with a concavo convex portion, from which extends the wheel's axle, and into the concave portion of this disk extends an end of the shaft. Between the shaft and rotatable disk are a plurality of concentrically arranged members pivotally connected, and which are also pivotally mounted on the disk in the plane thereof to permit the pivotal connection to assume various positions within the concave portion of the disk to thereby permit of various guiding movements of the wheel.

Other objects and advantages of the invention will become apparent from the following detailed description thereof taken in connection with the accompanying drawings. While a preferred embodiment of the invention is disclosed in the drawings, it is to be understood that the construction therein shown is for the purposes of illustration only, and not as defining the limits of the invention.

In the drawings:—

Figure 1 is a sectional view through a portion of a driving shaft, a wheel and its universal connections.

Fig. 2 is a front elevation with the wheel removed looking at the end of the axle.

Fig. 3 is a rear elevation with the dust caps removed and the shaft broken off.

Fig. 4 is a detail view of the pivotal elements for the shaft which have pivotal connection with the rotatable disk.

Fig. 5 is a detail view of the rotatable disk disclosing the concave portion thereof.

Fig. 6 is a detail view of the disk disclosing the convex portion thereof.

Fig. 7 is a detail view of the guiding plate.

Fig. 8 is a detail view of the case cap.

Fig. 9 is an enlarged detail view disclosing the arrangement of the anti-friction members between the guide member, case-cap and rotatable disk.

Fig. 10 is a vertical sectional view through the guide plate and the case cap with the rotatable disk removed.

The invention disclosed in the accompanying drawings contains a drive shaft 1, a shaft casing 2, and a vehicle wheel 3, all of which may be of the usual or any preferred construction. The casing 2 is shown provided with oppositely extended arms 4, 5, having outwardly directed ends 6 provided to receive pintles 7 of a guide plate 8. This guide plate is shown provided with a central aperture 9, and provided also with a raceway 10 near its outer periphery. Adjacent the aperture 9 the guide plate may have a flanged portion 11 to provide a raceway for anti-friction members 12. The plate 8 may be provided with an arm 13 to which may be connected a guide rod 14 of the steering mechanism of the vehicle.

A disk 15 is rotatably mounted between the guide plate 8 and a case-cap 16. This disk 15 is designed to be maintained out of frictional contact with the case-cap 16 and guide plate 8 by anti-friction bearings 17 and 18, the case-cap 16 being provided with a raceway 19 to receive the bearings 18. The case-cap is designed to be secured directly to the guide plate by any suitable means, shown as bolts 20. The rotatable disk is preferably provided with a concavo-convex portion 21, and from the central part of the convex portion may extend the axle 22. The concavo-convex portion of the disk 15 is designed to extend through the aperture 9 of the guide plate, and between disk portion 21 of disk 15 and the guide plate 8 are positioned the anti-friction members 11. Pivotally mounted to the disk plate 15 is an annular knuckle member 23, shown provided with trunnions 24 designed to operate in sockets 25 of the rotatable disk 15, and if desired, the sockets 25 may be closed by caps 26 to retain the trunnions 24 within the sockets. The sockets 25 are preferably formed in the plane of the disk 15 so that the annular member 23 may be moved relative to the concave portion of the disk member 21. Pivotally mounted within the annular member 23 may be a ball-like member 27, such member being shown pivoted at 28 to the member 23 by any suitable means, such as the trunnions, and such pivotal connections being made at substantially ninety degrees from the pivotal connections 24 of the annular member 23 with the rotatable disk 15, it being understood that the member 23 may be composed of two substantially identical sections 23ª and 23ᵇ, as shown in Fig. 4 to facilitate assembling the parts as above described, said sections being retained in coincident relation with respect to each other by suitable bolts or rivets 34. The ball-like member 27 is preferably provided with an angular recess 29 to receive an angular end 30 of the shaft 1, whereby the ball-like member 27 will be moved in unison with the movements of the shaft 1. This ball-like member 27 is designed to be variously positioned within the concave portion 21 of the disk, so that the ball-like member 27 and the annular member 23 may assume various positions relative to the disk in communicating the rotating movement of the shaft 1 to the rotatable disk 15 and its axle 22. The wheel 3 may be secured to the axle for movement therewith by any suitable means. To protect the pivotal connections between the shaft 1 and disk 15 from dust and injury, there may be provided a dust-cap 31, which is shown provided with a slot 32 extending from the periphery thereof toward the direction of the central part of the cap 31 to facilitate the passage of the cap 31 over the end of the shaft 1. The cap 31 may be secured to the case-cap 16 by any suitable means. To protect the members 23 and 27 from dust and mud that might work through the slot 32 in the cap 31, there may be provided an interior dust cap 33, mounted on the end of the shaft 1, to rotate therewith. It is obvious however, that this cap 33 may be omitted if desired.

By the arrangement described and illustrated the rotative movement of the shaft 1 will be communicated to the axle 22 through the pivotal elements 23 and 27, irrespective of the position of the guide members 8 and 16, and its rotatable disk 15 relative to the shaft. Therefore, the wheel may be directed by the guiding mechanism of the vehicle in the usual manner, and at the same time driven from the shaft 1.

It is obvious that various changes in the form and proportion of parts may be made without departing from the spirit of the invention, and the right is reserved to make such changes as fairly fall within the scope of the appended claims.

Having thus described the invention, what is claimed as new is:

1. In a device of the class described, a shaft, a stationary member, guiding elements pivoted therein, an axle, a disk carried thereby and rotatably mounted between the guiding elements, said axle disk having an annular member pivotally mounted in same, and pivotal connection between the shaft and the annular member.

2. In a device of the class described, a shaft, a member having spaced arms, guiding elements pivotally mounted between the spaced arms, an axle, a disk carried thereby rotatably mounted relative to the guiding elements, an annular member pivotally mounted in the disk, and a ball-like terminal carried by the end of the shaft and pivotally mounted within the annular member at points substantially midway between the pivotal points of the annular member.

3. In a device of the class described, a rotatable shaft, a sleeve for the shaft provided with spaced arms, guide plates pivotally mounted between the arms, an axle, a disk having a concavo-convex central portion and provided with a plurality of raceways, carried thereby antifriction bearings in the raceways to facilitate the rotation of the axle disk between the guide plates, an annular member pivotally mounted in the disk in alinement with the body thereof to permit the annular member to move within the concave portion of the disk, and a ball-like member carried by the shaft having pivotal connection with the annular member.

4. In a device of the class described, a rotatable shaft having an angular end, a sleeve for the shaft provided with spaced arms, guide plates pivotally mounted between the arms, an axle disk having a concavo-convex central portion, and provided with an axle extended from the central part of the convex portion, an annular member pivotally mounted in the disk for movement within the concave portion thereof, and a ball-like member pivotally mounted in the annular member for movement within the same, said ball-like member having an angular recess to receive the angular end of the rotatable shaft for movement therewith.

5. In a device of the class described, a shaft, a plurality of oppositely positioned arms, a guide plate having trunnions for pivotal engagement with the arms, means to connect the plate with steering mechanism of the vehicle, a case-cap coöperating with the guide plate to form guide members for anti-friction bearings, a disk having a concavo-convex central portion provided with an axle extending therefrom to receive a vehicle wheel, anti-friction bearings between the inner periphery of the guide plate and the concavo-convex portion and the disk, and a plurality of pivotal elements between the end of the shaft which projects into the concavo-convex portion and the disk.

6. In a device of the class described, a shaft, oppositely positioned supporting arms, a guide plate mounted for pivotal movement between the arms, a case-cap coöperating with the guide plate, a disk mounted for rotation between the guide plate and case-cap, and provided with a concavo-convex central portion from which extends a wheel axle, a plurality of pivotal members interposed between the shaft and disk and mounted for movement within the concave portion of the disk, a dust cap of substantially the diameter of the disk plate, and having a slotted portion to receive the shaft, and a smaller dust cap carried by the shaft to close the slot through the first mentioned dust cap to protect said pivotal members.

In testimony whereof I affix my signature, in presence of two witnesses.

JESSE WISMAN DAVIS.

Witnesses:
  JAMES MADISON ANTWINE,
  ASA LU THOMPSON.